US009740671B2

(12) United States Patent
Lin et al.

(10) Patent No.: US 9,740,671 B2
(45) Date of Patent: Aug. 22, 2017

(54) METHOD AND APPARATUS OF GENERATING A WEBPAGE FROM AN ORIGINAL DESIGN FILE COMPRISING LAYERS (71) Applicant: TENCENT TECHNOLOGY (SHENZHEN) COMPANY LIMITED, Shenzhen, Guangdong (CN)

(72) Inventors: Yue Lin, Shenzhen (CN); Li Xu, Shenzhen (CN); Renfei Wu, Shenzhen (CN); Xianghui Fu, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/103,055

(22) PCT Filed: Apr. 21, 2015

(86) PCT No.: PCT/CN2015/077059
§ 371 (c)(1),
(2) Date: Jun. 9, 2016

(87) PCT Pub. No.: WO2015/161778
PCT Pub. Date: Oct. 29, 2015

(65) Prior Publication Data
US 2016/0314099 A1 Oct. 27, 2016

(30) Foreign Application Priority Data

Apr. 23, 2014 (CN) .......................... 2014 1 0164217

(51) Int. Cl.
G06F 17/00 (2006.01)
G06F 17/22 (2006.01)
(Continued)

(52) U.S. Cl.
CPC ........ G06F 17/2247 (2013.01); G06F 17/211 (2013.01); G06F 17/3089 (2013.01)

(58) Field of Classification Search
CPC . G06F 17/3089; G06F 17/2247; G06F 17/211
See application file for complete search history.

(56) References Cited

U.S. PATENT DOCUMENTS 5,819,302 A * 10/1998 Nielsen ............. G06F 17/30905
707/E17.121
6,336,124 B1 * 1/2002 Alam .................. G06F 17/2229
707/E17.006
(Continued)

FOREIGN PATENT DOCUMENTS

CN 101976260 A 2/2011
CN 101976269 A 2/2011
(Continued)

OTHER PUBLICATIONS

International Search Report and Written Opinion of the ISA for PCT/CN2015/077059, ISA/CN, mailed Jul. 8, 2015.

Primary Examiner — Cesar Paula
Assistant Examiner — James H Blackwell
(74) Attorney, Agent, or Firm — Harness, Dickey & Pierce, P.L.C.

(57) ABSTRACT

A webpage generating method includes: obtaining a size of an original design file and layer information of a layer included in the original design file; obtaining a material included in the layer; and generating a webpage according to the size of the original design file, the layer information of the layer, and the material included in the layer.

10 Claims, 6 Drawing Sheets (51) Int. Cl.
*G06F 17/30* (2006.01)
*G06F 17/21* (2006.01)

(56) References Cited

U.S. PATENT DOCUMENTS

| | | | | |
|---|---|---|---|---|
| 7,747,941 | B2* | 6/2010 | Campbell | G06F 17/211 |
| | | | | 715/234 |
| 7,904,570 | B1* | 3/2011 | Kroupa | G06F 17/30067 |
| | | | | 709/201 |
| 8,707,164 | B2* | 4/2014 | Adler, III | G06F 17/214 |
| | | | | 715/200 |
| 9,251,123 | B2* | 2/2016 | Heinz | G06F 17/211 |
| 9,471,550 | B2* | 10/2016 | Boutelle | G06F 17/214 |
| 2004/0123244 | A1* | 6/2004 | Campbell | G06F 17/243 |
| | | | | 715/253 |
| 2007/0162846 | A1* | 7/2007 | Cave | G06F 17/3089 |
| | | | | 715/210 |
| 2009/0249193 | A1* | 10/2009 | Hanechak | G06F 17/2229 |
| | | | | 715/235 |
| 2010/0077320 | A1* | 3/2010 | Lepore | G06F 17/211 |
| | | | | 715/760 |
| 2012/0110436 | A1* | 5/2012 | Adler, III | G06F 17/214 |
| | | | | 715/234 |
| 2013/0238982 | A1* | 9/2013 | Gong | G06F 17/3089 |
| | | | | 715/234 |
| 2014/0129924 | A1* | 5/2014 | Le Bescond de Coatpont | G06F 17/2247 |
| | | | | 715/234 |

FOREIGN PATENT DOCUMENTS

| | | |
|---|---|---|
| CN | 103365855 A | 10/2013 |
| KR | 20030046030 A | 6/2003 |

* cited by examiner

METHOD AND APPARATUS OF GENERATING A WEBPAGE FROM AN ORIGINAL DESIGN FILE COMPRISING LAYERS

CROSS-REFERENCE TO RELATED APPLICATIONS

This application is a 371 National Phase application of PCT/CN2015/077059, filed on Apr. 21, 2015, which claims the benefit of and priority to Chinese Patent Application No. 201410164217.6 filed on Apr. 23, 2014 by Tencent Technology (Shenzhen) Co., Ltd. and entitled "WEBPAGE GENERATING METHOD AND APPARATUS", the disclosures of which are incorporated herein by reference in their entirety.

FIELD OF THE TECHNOLOGY

The present disclosure relates to the field of computer technologies, and in particular, to a webpage generating method and apparatus.

BACKGROUND OF THE DISCLOSURE

A webpage is a page including a material such as a text, a picture, or a table. A webpage that is well laid out and beautiful attracts users more easily. In order to make a webpage well-laid-out and beautiful, before a webpage is created, an image processing tool is first used to arrange a layout of all materials included in the webpage and beautify each material, so as to obtain an original design file. For example, for a material, assuming that the material is a button with a planar structure, the button may be beautified so that the button becomes three-dimensional. Then the webpage is generated according to the obtained original design file. The webpage generated in this way is well laid out and beautiful.

In that process, a designer drags each material included in the webpage to a processing panel of the image processing tool, arranges the layout, and then uses a beautification tool included in the image processing tool to beautify each material, so as to obtain the original design file of the webpage. The designer submits the original design file to a webpage developer, and the webpage developer writes webpage code according to experience, where each material included in the original design file is written into webpage code, and then performs rendering for the webpage according to the webpage code, so as to convert the original design file into a webpage.

However, because the webpage developer writes the webpage code according to experience to generate the webpage, limited by the experience of the webpage developer, webpage generating efficiency is low, the generated webpage has poor quality, and webpage generating costs are increased.

SUMMARY

An aspect provides a webpage generating method, the method including:

obtaining a size of an original design file and layer information of a layer included in the original design file;

obtaining a material included in the layer; and generating a webpage according to the size of the original design file, the layer information of the layer, and the material included in the layer.

Another aspect provides a webpage generating apparatus, the apparatus including:

a first obtaining module, configured to obtain a size of an original design file and layer information of a layer included in the original design file;

a second obtaining module, configured to obtain a material included in the layer; and a generating module, configured to generate a webpage according to the size of the original design file, the layer information of the layer, and the material included in the layer.

BRIEF DESCRIPTION OF THE DRAWINGS

FIG. 3-1 is a flowchart of a webpage generating method according to Embodiment 2 of the present invention;

FIG. 3-2 is a second schematic diagram of a layer panel according to Embodiment 2 of the present invention;

FIG. 3-3 is a first schematic diagram of a smallest area according to Embodiment 2 of the present invention;

FIG. 3-4 is a second schematic diagram of a smallest area according to Embodiment 2 of the present invention;

FIG. 3-5 is a first schematic diagram of a webpage according to Embodiment 2 of the present invention;

FIG. 3-6 is a second schematic diagram of a webpage according to Embodiment 2 of the present invention;

FIG. 3-7 is a third schematic diagram of a webpage according to Embodiment 2 of the present invention;

DESCRIPTION OF EMBODIMENTS

To make the objective, technical solutions, and advantages of the present disclosure clearer, implementation manners of the present disclosure are described in further detail with reference to accompanying drawings in the following.

In order to make a webpage well-laid-out and beautiful, a designer first uses an image processing tool to arrange a layout of all materials included in the webpage and beautify each material, so as to obtain an original design draft, where the original design draft includes multiple layers, and each layer includes at least one material. Then the designer uses a layer panel of the image processing tool to sort the layers included in the original design draft, and saves the sorted original design draft as an original design file.

Figure 1:
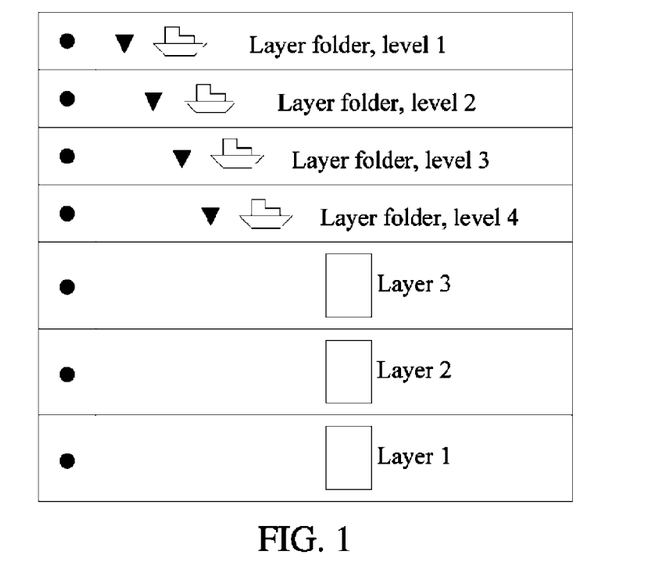
FIG. 1 is a first schematic diagram of a layer panel according to an embodiment of the present invention.

When the layers included in the original design draft are sorted, the layers included in the original design draft are classified into levels by using the layer panel included in the image processing tool, and layers located at a same level are stored in a layer folder corresponding to the level. Layers included in a layer folder having a higher level is ranked at a lower tier of the original design draft, and one layer folder is nested in another layer folder, where a layer folder having a higher level is nested in a layer folder having a lower level. As shown in FIG. 1, a layer folder corresponding to level 4 is nested in a layer folder corresponding to level 3, the layer folder corresponding to level 3 is nested in a layer folder corresponding to level 2, the layer folder corresponding to level 2 is nested in a layer folder corresponding to level 1, and layers 1, 2, and 3 included in the layer folder corresponding to level 4 are ranked at the bottom of the original design draft.

The image processing tool may be PhotoShop, Dreamweaver, Flash, or the like. An original design file obtained by processing each material included in a webpage by using PhotoShop is a PSD file, an original design file obtained by processing each material included in a webpage by using Dreamweaver may be a PHP file, an ASP file, or the like, and an original design file obtained by processing each material included in a webpage by using Flash is a FLA file.

After the original design file is obtained, the webpage may be automatically generated according to the original design file by using a method provided by the following embodiments of the present invention.

Embodiment 1

Figure 2:
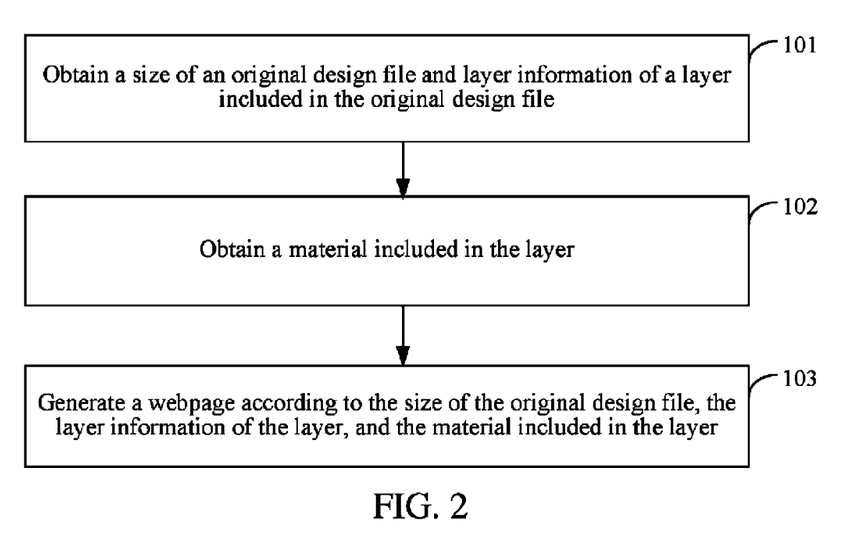
FIG. 2 is a flowchart of a webpage generating method according to Embodiment 1 of the present invention.

Referring to FIG. 2, an embodiment of the present invention provides a webpage generating method, including:

Step 101: Obtain a size of an original design file and layer information of a layer included in the original design file.

Step 102: Obtain a material included in the layer.

Step 103: Generate a webpage according to the size of the original design file, the layer information of the layer, and the material included in the layer.

Optionally, the layer information at least includes a sequence number and a type of the layer and a position and a size of the material included in the layer; and the obtaining layer information of a layer included in the original design file includes:

obtaining a position and a size of a smallest area including all materials in the layer;

determining that the position and the size of the smallest area are the position and the size of the material included in the layer;

allocating the sequence number to the layer; and obtaining a type attribute of the layer, and obtaining the type of the layer according to the type attribute.

Further, if the type of the layer is text layer, the layer information of the layer further includes pattern information of the layer; and the obtaining layer information of a layer included in the original design file further includes:

obtaining a pattern attribute of the layer, and obtaining the pattern information of the layer according to the pattern attribute.

Optionally, the obtaining a material included in the layer includes:

obtaining text content included in the layer if a type of the layer is text layer, and determining that the obtained text content is the material included in the layer; and taking a screenshot of a smallest area including all materials included in the layer if a type of the layer is image layer, to obtain the screenshot corresponding to the layer, and determining that the screenshot is the material included in the layer.

Further, before the obtaining layer information of a layer included in the original design file, the method further includes:

obtaining a level of each layer folder included in the original design file, and combining all layers included in a layer folder of which a level is greater than a preset value into one layer.

Optionally, the generating a webpage according to the size of the original design file, the layer information of the layer, and the material included in the layer includes:

creating a blank webpage according to the size of the original design file, where the blank webpage includes a content area, and a size of the content area is equal to the size of the original design file;

creating a display area corresponding to the layer in the content area according to a position and a size of the material that are included in the layer information of the layer; and loading the material included in the layer to the display area corresponding to the layer, to generate the webpage.

Optionally, the loading the material included in the layer to the display area corresponding to the layer includes:

loading text content included in the layer to the display area corresponding to the layer if a type of the layer is text layer, and setting a pattern of the text content according to pattern information included in the layer information of the layer; and loading a screenshot corresponding to the layer to the display area corresponding to the layer if a type of the layer is image layer.

In this embodiment of the present invention, a size of an original design file and layer information of a layer included in the original design file are obtained; a material included in the layer is obtained; and a webpage is generated according to the size of the original design file, the layer information of the layer, and the material included in the layer. The original design file is converted into the webpage according to the size of the original design file, the layer information of the layer, and the material included in the layer, thereby automatically generating the webpage. In this way, webpage generating efficiency is improved, webpage generating costs are reduced, and quality of a generated webpage is ensured.

Embodiment 2

Figure 31:
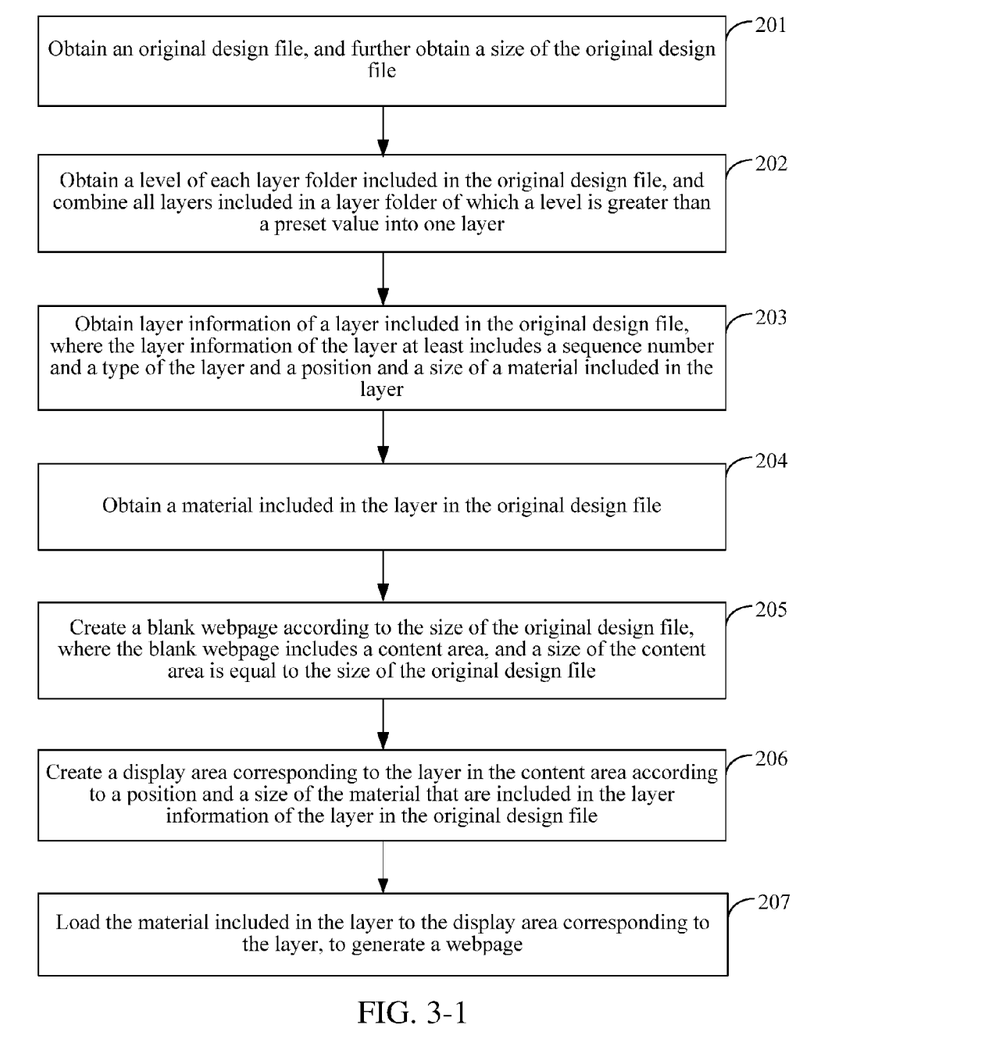

Referring to FIG. 3-1, an embodiment of the present invention provides a webpage generating method. The method includes:

Step 201: Obtain an original design file, and further obtain a size of the original design file.

This embodiment of the present invention may be executed by a terminal generating a webpage or a functional module integrated in an image processing tool. When this embodiment is executed by a terminal, a user may input an original design file that needs to be converted into a webpage into the terminal, and the terminal receives the original design file, so as to obtain the original design file. When this embodiment is executed by a functional module in an image processing tool, because the image processing tool includes an original design file, the functional module may directly obtain the original design file from the image processing tool.

The obtaining an original design file may be receiving the original design file input by a user, or directly obtaining the original design file from an image processing tool after the image processing tool obtains the original design file.

The size of the original design file includes the width and the height of the original design file. Attribute information of the original design file at least includes width attribute information and height attribute information, where the width attribute information at least includes the width of the original design file, and the height attribute information at least includes the height of the original design file.

As for the size of the original design file, the width attribute information and the height attribute information of the original design file may be obtained from the attribute information of the original design file, the width of the original design file is obtained from the obtained width attribute information, and the height of the original design file is obtained from the obtained height attribute information, thereby obtaining the size of the original design file.

For example, original design file F1 input by a user is received, or original design file F1 is directly obtained from an image processing tool after the image processing tool obtains the original design file. Width attribute information and height attribute information of original design file F1 may be obtained from attribute information of original design file F1, where the width of original design file F1 that is obtained from the obtained width attribute information is 50, and the height of original design file F1 that is obtained from the obtained height attribute information is 100, thereby obtaining the size of original design file F1.

Step 202: Obtain a level of each layer folder included in the original design file, and combine all layers included in a layer folder of which a level is greater than a preset value into one layer.

When the original design file includes a large number of layers, efficiency of generating a webpage according to the original design file is low. Therefore, layers located at a low tier of the original design file needs to be combined, so as to reduce the number of layers included in the original design file, thereby improving webpage generating efficiency.

This step is specifically: obtaining a level of each layer folder included in the original design file, comparing the level of each layer folder with a preset value, obtaining all layers included in a layer folder of which a level is greater than the preset value, and combining all the obtained layers into one layer.

Figure 32:
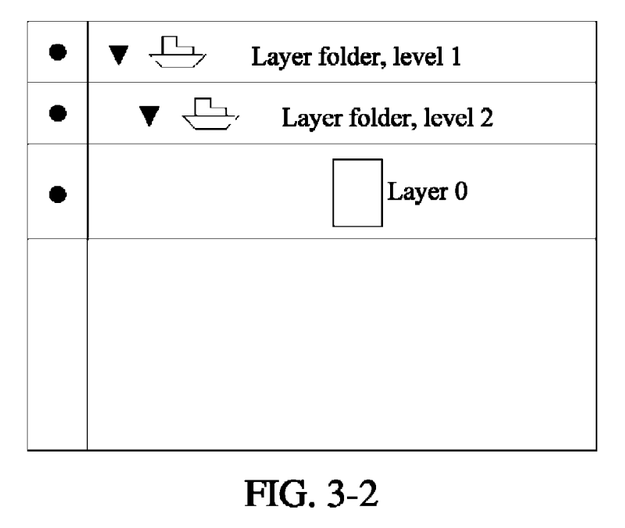

For example, it is assumed that the preset value is 2. Levels of layer folders 1, 2, 3, and 4 included in original design file F1 are obtained, where the levels are levels 1, 2, 3, and 4; the levels of the layer folders 1, 2, 3, and 4 are separately compared with the preset value 2, and it is determined through comparison that level 3 and level 4 of layer folders 3 and 4 are greater than the preset value 2; and layers included in layer folder 3 are obtained, and layers included in layer folder 4 are obtained. It is assumed that the obtained layers included in layer folder 3 are layers and 2, and the obtained layers included in layer folder 4 are layers 3 and 4. As shown in FIG. 3-2, the obtained layers 1, 2, 3, and 4 are combined into layer 0, and layer 0 obtained through combination is stored in layer folder 2.

After all the layers included in the layer folder of which the level is greater than the preset value are combined through the operation of step 202, layer information of a layer and a material included in the layer may be obtained through the following operations of steps 203 and 204.

Step 203: Obtain layer information of a layer included in the original design file, where the layer information of the layer at least includes a sequence number and a type of the layer and a position and a size of a material included in the layer.

Types of layers include text layer and image layer. When materials included in a layer are all text content, a type of the layer is text layer. When materials included in a layer are all images or include both an image material and text content, the layer is an image layer.

This step is specifically: starting traverse from a layer included in a layer folder having a greatest level, and traversing all layers included in the original design file in order from a layer at the bottom to a layer at the top; each time a layer is traversed, obtaining a traversing order corresponding to the layer, and determining that the traversing order corresponding to the layer is a sequence number of the layer; determining a smallest area including all materials in the layer, obtaining a position and a size of the smallest area, and determining that the position and the size of the smallest area is a position and a size of a material included in the layer; obtaining type attribute information from attribute information of the layer, and obtaining a type of the layer from the obtained type attribute information; determining the type of the layer, obtaining pattern attribute information of the layer from the attribute information of the layer if the type of the layer is text layer, obtaining pattern information of the layer from the pattern attribute information, and using the sequence number and the type of the layer, the position and the size of the material included in the layer, and the pattern information of the layer together as layer information of the layer; using the sequence number and the type of the layer and the position and the size of the material included in the layer together as layer information of the layer if the type of the layer is image layer; determining whether a current traversed layer is the layer at the top, and continuing to traverse a next layer if the current traversed layer is not the layer at the top, until layer information of the layer at the top is obtained.

The smallest area is a rectangular area. The position of the smallest area may be upper-left vertex coordinates, upper-right vertex coordinates, or center coordinates of the smallest area. The size of the smallest area may be the width and the height of the smallest area.

Figure 33:
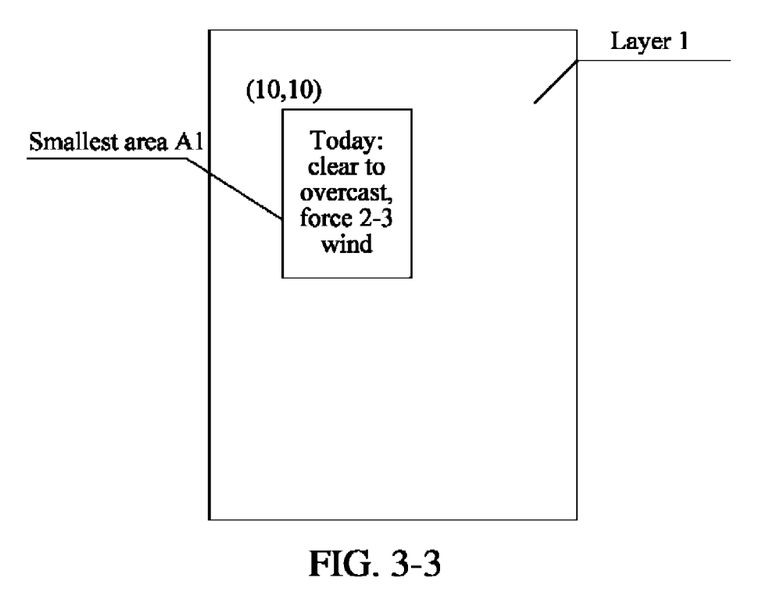

For example, starting from a layer included in a layer folder corresponding to level 2, all layers included in original design file F1 are traversed in order from bottom to top. Each time a layer is traversed, a traversing order corresponding to the layer is obtained. Assuming that a traversing order of layer 1 is 01, it is determined that the traversing order 01 of layer 1 is a sequence number of layer 1. Smallest area A1 of layer 1 is determined. As shown in FIG. 3-3, smallest area A1 exactly includes a material "today: clear to overcast, force 2-3 wind" included in layer 1. It is assumed that a position of smallest area A1 is upper-left vertex coordinates (10, 10) of smallest area A1, and a size of smallest area A1 is a width 20 and a height 40. The upper-left vertex coordinates (10, 10) of smallest area A1 are obtained, and the width 20 and the height 40 of smallest area A1 are obtained. It is determined that the upper-left vertex coordinates (10, 10) and the width 20 and the height 40 of smallest area A1 are a position and a size of the material included in layer 1. Type attribute information is obtained from attribute information of layer 1, and a type, which is text layer, of layer 1 is obtained from the obtained type attribute information. The type of layer 1 is determined, and it is determined that the type of layer 1 is text layer; therefore, pattern attribute information of layer 1 is obtained from the attribute information of layer 1, and pattern information S1 of layer 1 is obtained from the obtained pattern attribute information. The sequence number 01 and the type, which is text layer, of layer 1, the position (10, 10) and the size, which is the width 20 and the height 40, of layer 1, and pattern information S1 of layer 1 are used together as layer information of layer 1. It is determined whether current traversed layer 1 is a layer at the top. If it is determined that current traversed layer 1 is not the layer at the top, a next layer is traversed until layer information of the layer at the top is obtained.

Figure 34:
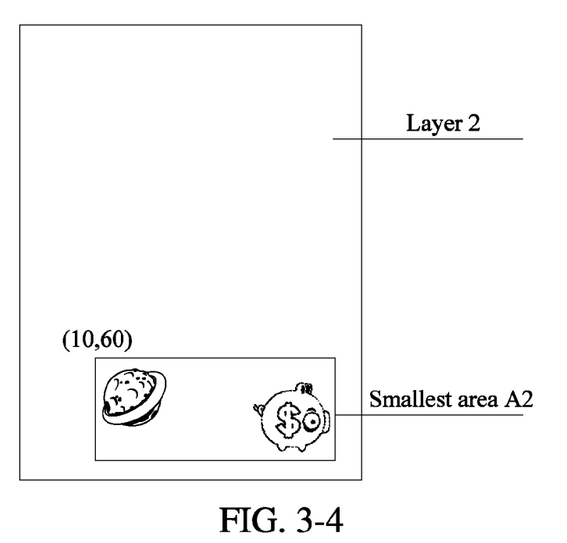

For another example, layer 2 is then traversed, a traversing order of layer 2 is 02, and it is determined that the traversing order 02 of layer 2 is a sequence number of layer 2. Smallest area A2 of layer 2 is determined. As shown in FIG. 3-4, smallest area A2 exactly includes two images included in layer 2. It is assumed that a position of smallest area A2 is upper-left vertex coordinates (10, 60) of the smallest area, and a size of smallest area A2 is a width 30 and a height 20. The upper-left vertex coordinates (10, 60) of smallest area A2 are obtained, and the width 30 and the height 20 of smallest area A2 are obtained. It is determined that the upper-left vertex coordinates (10, 60) and the width 30 and the height 20 of smallest area A2 are a position and a size of a material included in layer 2. Type attribute information is obtained from attribute information of layer 2, and a type, which is image layer, of layer 2 is obtained from the obtained type attribute information. The type of layer 2 is determined, and it is determined that the type of layer 2 is image layer. Therefore, the sequence number 02 and the type, which is image layer, of layer 2 and the position (10, 60) and the size, which is the width 30 and the height 20, of the material included in layer 2 are used together as layer information of layer 2.

A sequence number of a layer can indicate a position at which the layer is ranked among all layers included in the original design file.

A layer has attribute information, where the attribute information of the layer at least includes type attribute information, and the type attribute information of the layer at least includes a type of the layer. Attribute information of a layer of which a type is text layer further includes pattern attribute information, where the pattern attribute information at least includes pattern information of the layer.

After the size of the original design file and the layer information of the layer in the original design file are obtained according to the operations of steps 201 to 203, the size of the original design file and the layer information of the layer in the original design file are saved as a data file. The size of the original design file and the layer information of the layer in the original design file may be saved as a data file in a manner of JavaScript object notation (JSON, a lightweight data exchange language) or Extensible Markup Language (XML).

After the layer information of the layer included in the original design file is obtained according to the operation of step 203, a material included in the layer is obtained according to the following operation of step 204.

Step 204: Obtain a material included in the layer in the original design file.

For each layer included in the original design file, this step may be implemented in the first or second manner according to a difference in a type of the layer, which is specifically as follows:

The first manner: Obtain text content included in the layer if a type of the layer is text layer, and determine that the obtained text content is the material included in the layer.

For example, a type of layer 1 is text layer. Text content "today: clear to overcast, force 2-3 wind" included in layer 1 is obtained, and it is determined that the text content "today: clear to overcast, force 2-3 wind" is a material included in layer 1.

The second manner: Take a screenshot of a smallest area including all materials included in the layer if a type of the layer is image layer, to obtain the screenshot corresponding to the layer, and determine that the screenshot is the material included in the layer.

For example, a type of layer 2 is image layer. A screenshot of smallest area A2 including all materials in layer 2 is taken, to obtain screenshot P1 corresponding to layer 2, and it is determined that screenshot P1 is a material included in layer 2.

After the screenshot corresponding to the layer is obtained, the screenshot corresponding to the layer is further saved.

For each of other layers included in the original design file, a material included in each of the other layers is obtained according the same operation for the layer.

After the layer information of the layer included in the original design file and the material included in the layer are respectively obtained through the operation of step 203 and the operation of step 204, a webpage is generated through the following operations of steps 205 to 207.

Step 205: Create a blank webpage according to the size of the original design file, where the blank webpage includes a content area, and a size of the content area is equal to the size of the original design file.

The content area is used to display all materials included in a webpage.

This step is specifically: creating a blank webpage, and creating a content area in the blank webpage according to the size of the original design file, where the width and the height of the content area are respectively equal to the width and the height of the original design file.

Figure 35:
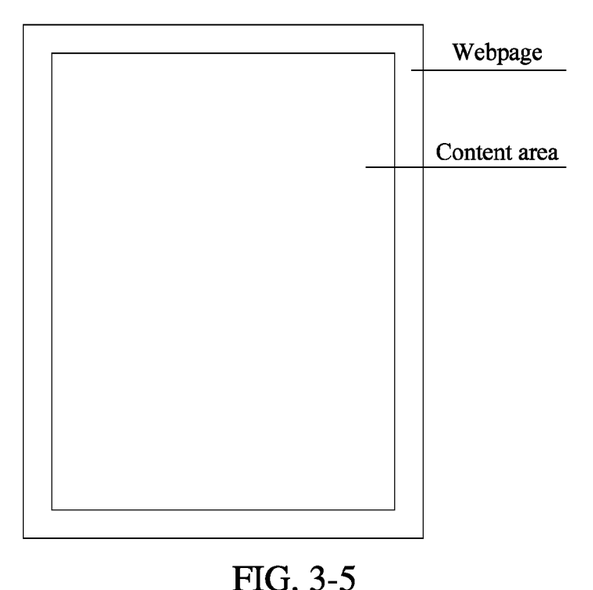

For example, as shown in FIG. 3-5, a blank webpage is created, and a content area is created in the blank webpage according to the size of the original design file, that is, the width 50 and the height 100 of the original design file, where the width and the height of the content area are respectively 50 and 100.

Further, after a content area is created in the blank webpage, the content area is arranged at the center of the blank webpage.

Before a content area is created in the blank webpage, a Hypertext Markup Language (HTML) document is created first, the data file obtained by saving the size of the original design file and the layer information of the layer in the original design file is input to the HTML document, and the HTML document parses the data file, so as to obtain the size of the original design file and the layer information of the layer in the original design file.

Step 206: Create a display area corresponding to the layer in the content area according to a position and a size of the material that are included in the layer information of the layer in the original design file.

A display area corresponding to each layer is used to display a material included in the layer.

This step is specifically: for each layer included in the original design file, creating a display area corresponding to the layer in a content area according to a position and a size of a material included in the layer. For each of other layers included in the original design file, a display area corresponding to each of the other layers is separately created in a content area according to the same operation for the layer.

Figure 36:
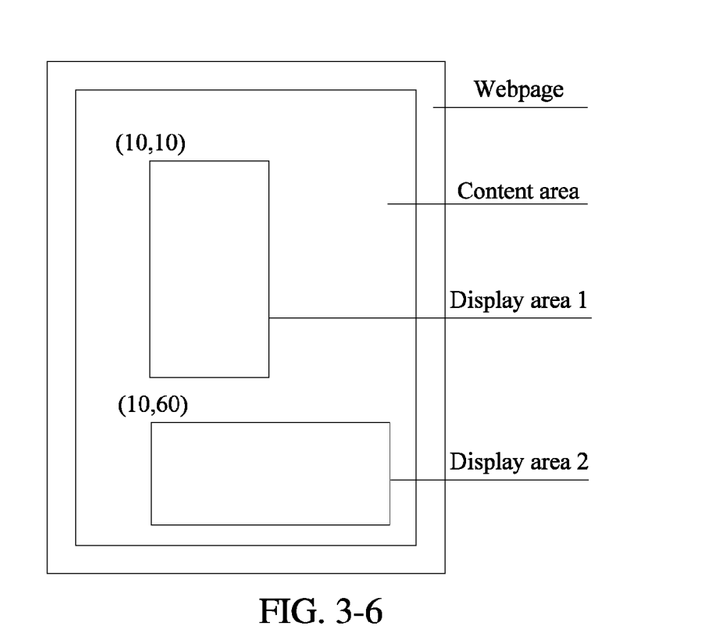

For example, display area 1 corresponding to layer 1 is created in the content area shown in FIG. 3-5 according to the position (10, 10), the width 20, and the height 40 of the material that are included in the layer information of layer 1. Display area 2 corresponding to layer 2 is created in the content area shown in FIG. 3-5 according to the position (10, 60), the width 30, and the height 20 of the material that are included in the layer information of layer 2, as shown in FIG. 3-6.

When a display area corresponding to the layer is created in the content area, a position attribute of the display area is set to absolute positioning, and then the position of the material included in the layer is set to a position of the display area. The display area may be a document object model (DOM, a node) in a webpage.

Step 207: Load the material included in the layer to the display area corresponding to the layer, to generate a webpage.

Specifically, for each layer included in the original design file, determining is performed for the layer according to a type included in layer information of the layer; if the type of the layer is text layer, text content included in the layer is loaded to a display area corresponding to the layer, and a pattern of the text content is set according to pattern information included in the layer information of the layer; and if the type of the layer is image layer, a screenshot corresponding to the layer is loaded to a display area corresponding to the layer.

For each of other layers included in the original design file, a material of each of the other layers is separately loaded to a display area corresponding to the layer.

Figure 37:
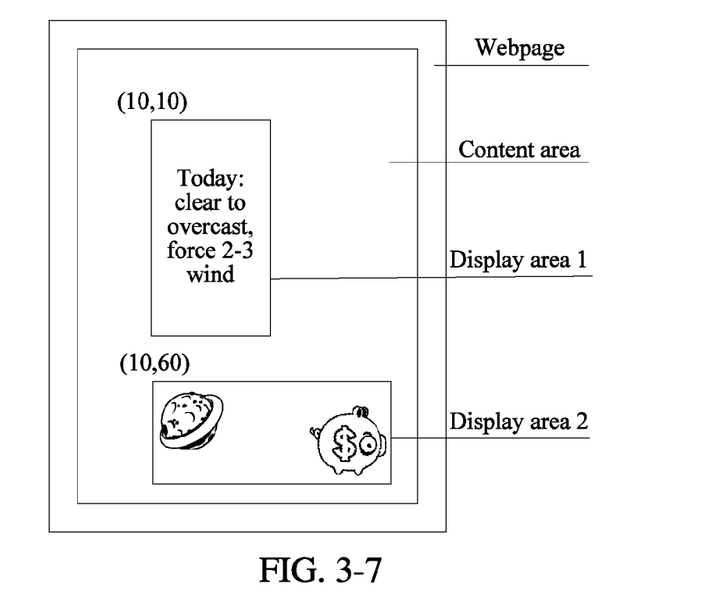

For example, determining is performed for layer 1 according to the type, which is text layer, included in the layer information of layer 1, and it is determined that the type of layer 1 is text layer; therefore, the text content "today: clear to overcast, force 2-3 wind" included in layer 1 is loaded to display area 1 corresponding to layer 1. Determining is performed for layer 2 according to the type, which is image layer, included in the layer information of layer 2, and it is determined that the type of layer 2 is image layer; therefore, screenshot P1 corresponding to layer 2 is loaded to display area 2 corresponding to layer 2, as shown in FIG. 3-7.

In this embodiment of the present invention, a size of an original design file and layer information of a layer included in the original design file are obtained; a material included in the layer is obtained; and a webpage is generated according to the size of the original design file, the layer information of the layer, and the material included in the layer. The original design file is converted into the webpage according to the size of the original design file, the layer information of the layer, and the material included in the layer, thereby automatically generating the webpage. In this way, webpage generating efficiency is improved, webpage generating costs are reduced, and quality of a generated webpage is ensured.

Embodiment 3

Figure 4:
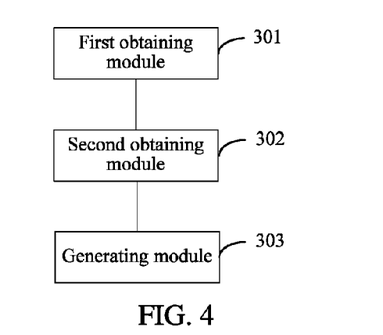
FIG. 4 is a schematic structural diagram of a webpage generating apparatus according to Embodiment 3 of the present invention.

Referring to FIG. 4, an embodiment of the present invention provides a webpage generating apparatus, including:

a first obtaining module 301, configured to obtain a size of an original design file and layer information of a layer included in the original design file;

a second obtaining module 302, configured to obtain a material included in the layer; and a generating module 303, configured to generate a webpage according to the size of the original design file, the layer information of the layer, and the material included in the layer.

The layer information at least includes a sequence number and a type of the layer and a position and a size of the material included in the layer; and the first obtaining module 301 includes:

a first obtaining unit, configured to obtain a position and a size of a smallest area including all materials in the layer;

a determining unit, configured to determine that the position and the size of the smallest area are the position and the size of the material included in the layer;

an allocating unit, configured to allocate the sequence number to the layer; and a second obtaining unit, configured to obtain a type attribute of the layer, and obtain the type of the layer according to the type attribute.

Further, if the type of the layer is text layer, the layer information of the layer further includes pattern information of the layer; and the first obtaining module 301 is further configured to obtain a pattern attribute of the layer, and obtain the pattern information of the layer according to the pattern attribute.

The second obtaining module 302 includes:

a third obtaining unit, configured to obtain text content included in the layer if the type of the layer is text layer, and determine that the obtained text content is the material included in the layer; and a fourth obtaining unit, configured to take a screenshot of the smallest area including all the materials included in the layer if the type of the layer is image layer, to obtain the screenshot corresponding to the layer, and determine that the screenshot is the material included in the layer.

Further, the apparatus further includes:

a combining module, configured to obtain a level of each layer folder included in the original design file, and combine all layers included in a layer folder of which a level is greater than a preset value into one layer.

The generating module 303 includes:

a first creating unit, configured to create a blank webpage according to the size of the original design file, where the blank webpage includes a content area, and a size of the content area is equal to the size of the original design file;

a second creating unit, configured to create a display area corresponding to the layer in the content area according to a position and a size of the material that are included in the layer information of the layer; and a loading unit, configured to load the material included in the layer to the display area corresponding to the layer, to generate the webpage.

The loading unit includes:

a first loading subunit, configured to load text content included in the layer to the display area corresponding to the layer if a type of the layer is text layer, and set a pattern of the text content according to pattern information included in the layer information of the layer; and a second loading subunit, configured to load a screenshot corresponding to the layer to the display area corresponding to the layer if a type of the layer is image layer.

In this embodiment of the present invention, a size of an original design file and layer information of a layer included in the original design file are obtained; a material included in the layer is obtained; and a webpage is generated according to the size of the original design file, the layer information of the layer, and the material included in the layer. The original design file is converted into the webpage according to the size of the original design file, the layer information of the layer, and the material included in the layer, thereby automatically generating the webpage. In this way, webpage generating efficiency is improved, webpage generating costs are reduced, and quality of a generated webpage is ensured.

Embodiment 4

Figure 5:
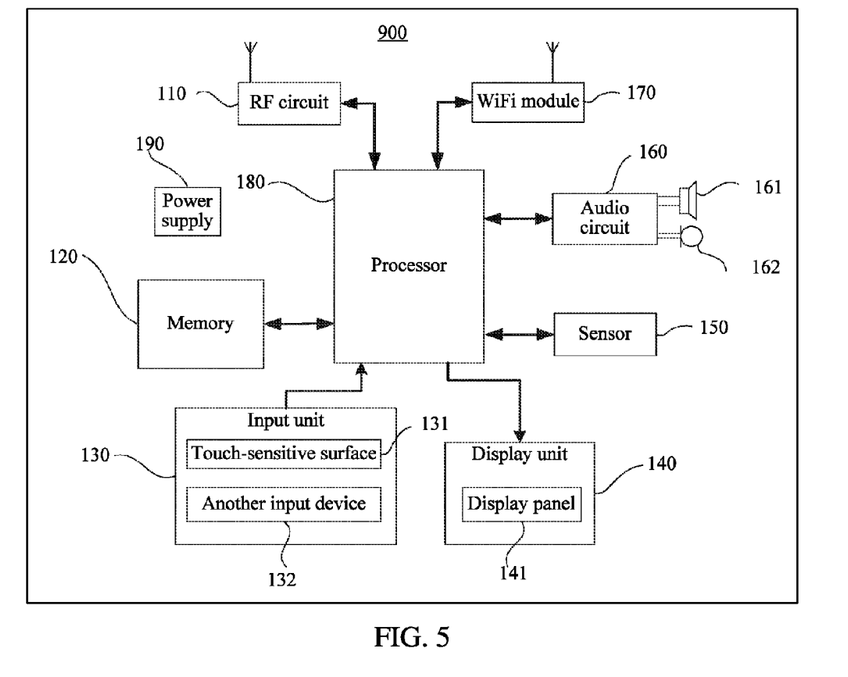
FIG. 5 is a schematic structural diagram of a terminal according to Embodiment 4 of the present invention.

Refer to FIG. 5, which is a schematic structural diagram of a terminal that is involved in an embodiment of the present invention and has a touch-sensitive surface. The terminal may be used to implement the webpage generating method provided in the foregoing embodiments, which is specifically as follows:

The terminal 900 may include components such as a radio frequency (RF) circuit 110, a memory 120 including one or more computer readable storage mediums, an input unit 130, a display unit 140, a sensor 150, an audio circuit 160, a wireless fidelity (WiFi) unit 170, a processor 180 including one or more processing cores, and a power supply 190. A person skilled in the art may understand that the structure of the terminal shown in FIG. 5 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, the RF circuit 110 receives downlink information from a base station, then delivers the downlink information to the processor 180 for processing, and sends designed uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device through wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 900, and the like. In addition, the memory 120 may include a high speed random access memory, and may also include a non-volatile memory such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 900. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 5, the touch-sensitive surface 131 and the display panel 141 are used as two separate parts to implement input and output functions, in some embodiments, the touch-sensitive surface 131 and the display panel 141 may be integrated to implement the input and output functions.

The terminal 900 may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 900 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 900, are not further described herein.

The audio circuit 160, a loudspeaker 161, and a microphone 162 may provide audio interfaces between the user and the terminal 900. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 900.

WiFi is a short distance wireless transmission technology. The terminal 900 may help, by using the WiFi module 170, the user to receive and send e-mails, browse a webpage, access streaming media, and so on, which provides wireless broadband Internet access for the user. Although FIG. 5 shows the WiFi module 170, it may be understood that the WiFi module is not a necessary component of the terminal 900, and when required, the WiFi module may be omitted as long as the scope of the essence of the present disclosure is not changed.

The processor 180 is the control center of the terminal 900, and is connected to various parts of the mobile phone by using various interfaces and lines. By running or executing the software program and/or module stored in the memory 120, and invoking data stored in the memory 120, the processor 180 performs various functions and data processing of the terminal 900, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal 900 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 900 may further include a camera, a Bluetooth module, and the like, which are not further described herein. Specifically, in this embodiment, the display unit of the terminal 900 is a touchscreen display. The terminal 900 further includes a memory and one or more programs, where the one or more programs are stored in the memory, and are set to be executed by one or more processors, and the one or more programs include instructions for performing the following operations:

obtaining a size of an original design file and layer information of a layer included in the original design file;

obtaining a material included in the layer; and generating a webpage according to the size of the original design file, the layer information of the layer, and the material included in the layer.

Optionally, the layer information at least includes a sequence number and a type of the layer and a position and a size of the material included in the layer; and the obtaining layer information of a layer included in the original design file includes:

obtaining a position and a size of a smallest area including all materials in the layer;

determining that the position and the size of the smallest area are the position and the size of the material included in the layer;

allocating the sequence number to the layer; and obtaining a type attribute of the layer, and obtaining the type of the layer according to the type attribute.

Further, if the type of the layer is text layer, the layer information of the layer further includes pattern information of the layer; and the obtaining layer information of a layer included in the original design file further includes:

obtaining a pattern attribute of the layer, and obtaining the pattern information of the layer according to the pattern attribute.

Optionally, the obtaining a material included in the layer includes:

obtaining text content included in the layer if a type of the layer is text layer, and determining that the obtained text content is the material included in the layer; and taking a screenshot of a smallest area including all materials included in the layer if a type of the layer is image layer, to obtain the screenshot corresponding to the layer, and determining that the screenshot is the material included in the layer.

Further, before the obtaining layer information of a layer included in the original design file, the method further includes:

obtaining a level of each layer folder included in the original design file, and combining all layers included in a layer folder of which a level is greater than a preset value into one layer.

Optionally, the generating a webpage according to the size of the original design file, the layer information of the layer, and the material included in the layer includes:

creating a blank webpage according to the size of the original design file, where the blank webpage includes a content area, and a size of the content area is equal to the size of the original design file;

creating a display area corresponding to the layer in the content area according to a position and a size of the material that are included in the layer information of the layer; and loading the material included in the layer to the display area corresponding to the layer, to generate the webpage.

Optionally, the loading the material included in the layer to the display area corresponding to the layer includes:

loading text content included in the layer to the display area corresponding to the layer if a type of the layer is text layer, and setting a pattern of the text content according to pattern information included in the layer information of the layer; and loading a screenshot corresponding to the layer to the display area corresponding to the layer if a type of the layer is image layer.

In this embodiment of the present invention, a size of an original design file and layer information of a layer included in the original design file are obtained; a material included in the layer is obtained; and a webpage is generated according to the size of the original design file, the layer information of the layer, and the material included in the layer. The original design file is converted into the webpage according to the size of the original design file, the layer information of the layer, and the material included in the layer, thereby automatically generating the webpage. In this way, webpage generating efficiency is improved, webpage generating costs are reduced, and quality of a generated webpage is ensured.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A webpage generating method, comprising:
   obtaining a size of an original design file, wherein the size includes display dimensions of the original design file;
   obtaining a level of each layer folder comprised in the original design file, and combining all layers comprised in layer folders levels of which are greater than a preset value into one layer;
   obtaining layer information of a layer comprised in the original design file in which all the layers comprised in the layer folders, the levels of which are greater than the preset value, are combined into one layer;
   obtaining a material comprised in the layer; and
   generating a webpage according to the size of the original design file, the layer information of the layer, and the material comprised in the layer;
   wherein obtaining the material comprised in the layer comprises:
   determining whether a type of the layer is text layer or image layer, wherein in response to determining that materials comprised in the layer is all text content, determining that the type of the layer is the text layer, and in response to determining that the materials comprised in the layer comprises both image materials and text content or comprises all image materials, determining that the type of the layer is image layer;
   obtaining text content comprised in the layer in response to determining the type of the layer is text layer, and determining that the obtained text content is the material comprised in the layer; and
   taking a screenshot of a smallest area comprising all materials comprised in the layer in response to determining the type of the layer is image layer, obtaining the screenshot corresponding to the layer, and determining that the screenshot is the material comprised in the layer.

2. The method according to claim 1, wherein the layer information at least comprises a sequence number and a type of the layer and a position and a size of the material comprised in the layer; and
   the obtaining layer information of a layer comprised in the original design file comprises:
   obtaining a position and a size of a smallest area comprising all materials in the layer;
   determining that the position and the size of the smallest area are the position and the size of the material comprised in the layer;
   allocating the sequence number to the layer; and
   obtaining a type attribute of the layer, and obtaining the type of the layer according to the type attribute.

3. The method according to claim 2, wherein in response to determining the type of the layer is text layer, the layer information of the layer further comprises pattern information of the layer; and
   the obtaining layer information of a layer comprised in the original design file further comprises:
   obtaining a pattern attribute of the layer, and obtaining the pattern information of the layer according to the pattern attribute.

4. The method according to claim 1, wherein the generating a webpage according to the size of the original design file, the layer information of the layer, and the material comprised in the layer comprises:
   creating a blank webpage according to the size of the original design file, wherein the blank webpage comprises a content area, and a size of the content area is equal to the size of the original design file;
   creating a display area corresponding to the layer in the content area according to a position and a size of the material that are comprised in the layer information of the layer; and
   loading the material comprised in the layer to the display area corresponding to the layer, to generate the webpage.

5. The method according to claim 4, wherein the loading the material comprised in the layer to the display area corresponding to the layer comprises:
   loading text content comprised in the layer to the display area corresponding to the layer in response to determining the type of the layer is text layer, and setting a pattern of the text content according to pattern information comprised in the layer information of the layer; and
   loading a screenshot corresponding to the layer to the display area corresponding to the layer in response to determining the type of the layer is image layer.

6. A webpage generating apparatus, the apparatus comprising:
   a processor;
   a memory which stores computer readable instructions that when executed by the processor cause the processor to:
   obtain a size of an original design file, wherein the size includes display dimensions of the original design file;
   obtain a level of each layer folder comprised in the original design file, and combine all layers comprised in layer folders levels of which are greater than a preset value into one layer;
   obtain layer information of a layer comprised in the original design file in which all the layers comprised in the layer folders, the levels of which are greater than the preset value, are combined into one layer;
   obtain a material comprised in the layer; and
   generate a webpage according to the size of the original design file, the layer information of the layer, and the material comprised in the layer;
   wherein obtaining the material comprised in the layer comprises:
   determining whether a type of the layer is text layer or image layer, wherein in response to determining that materials comprised in the layer is all text content, determining that the type of the layer is the text layer, and in response to determining that the materials comprised in the layer comprises both image materials and text content or comprises all image materials, determining that the type of the layer is image layer;
   obtaining text content comprised in the layer in response to determining the type of the layer is text layer, and determining that the obtained text content is the material comprised in the layer; and
   taking a screenshot of a smallest area comprising all materials comprised in the layer in response to determining the type of the layer is image layer, to obtain the screenshot corresponding to the layer, and determining that the screenshot is the material comprised in the layer.

7. The apparatus according to claim 6, wherein the layer information at least comprises a sequence number and a type of the layer and a position and a size of the material comprised in the layer; and     the obtaining layer information of a layer comprised in the original design file comprises:

obtaining a position and a size of a smallest area comprising all materials in the layer;

determining that the position and the size of the smallest area are the position and the size of the material comprised in the layer;

allocating the sequence number to the layer; and obtaining a type attribute of the layer, and obtaining the type of the layer according to the type attribute.

8. The apparatus according to claim 7, wherein in response to determining the type of the layer is text layer, the layer information of the layer further comprises pattern information of the layer; and     the obtaining layer information of a layer comprised in the original design file further comprises:

obtaining a pattern attribute of the layer, and obtaining the pattern information of the layer according to the pattern attribute.

9. The apparatus according to claim 6, wherein the generating a webpage according to the size of the original design file, the layer information of the layer, and the material comprised in the layer comprises:

creating a blank webpage according to the size of the original design file, wherein the blank webpage comprises a content area, and a size of the content area is equal to the size of the original design file;

creating a display area corresponding to the layer in the content area according to a position and a size of the material that are comprised in the layer information of the layer; and     loading the material comprised in the layer to the display area corresponding to the layer, to generate the webpage.

10. The apparatus according to claim 9, wherein the loading the material comprised in the layer to the display area corresponding to the layer comprises:

loading text content comprised in the layer to the display area corresponding to the layer in response to determining the type of the layer is text layer, and setting a pattern of the text content according to pattern information comprised in the layer information of the layer; and     loading a screenshot corresponding to the layer to the display area corresponding to the layer in response to determining the type of the layer is image layer.

\* \* \* \* \*